United States Patent [19]
Timmer et al.

[11] 3,974,542
[45] Aug. 17, 1976

[54] LOCKING DEVICE FOR A CASTORWHEEL FORK

[75] Inventors: Hendrikus J. M. Timmer, Tiel; Johannes C. J. Lazaroms, Veenendaal, both of Netherlands

[73] Assignee: SKF Industrial Trading and Development Company, B.V., Jutphaas, Netherlands

[22] Filed: Apr. 16, 1975

[21] Appl. No.: 568,717

[30] Foreign Application Priority Data
Apr. 22, 1974 Netherlands............... 7405398

[52] U.S. Cl.............................................. 16/35 R
[51] Int. Cl.²...................................... B60B 33/02
[58] Field of Search............. 16/18 R, 21, 22, 35 R, 16/20

[56] References Cited
UNITED STATES PATENTS

| | | | |
|---|---|---|---|
| 2,421,464 | 6/1947 | Reiner | 16/35 R X |
| 2,468,399 | 4/1949 | Grossman | 16/18 R |
| 2,750,619 | 6/1956 | Kramcsak, Jr. | 16/21 |
| 3,213,518 | 10/1965 | Saito | 16/21 X |
| 3,547,459 | 12/1970 | Lapham | 16/20 X |
| 3,604,212 | 9/1971 | Lewin | 16/35 R |
| 3,890,669 | 6/1975 | Reinhards | 16/35 R |

*Primary Examiner*—Werner H. Schroeder
*Attorney, Agent, or Firm*—Daniel M. Rosen

[57] ABSTRACT

Locking device for a steerable castor, comprising a swivel fork connected through a roller bearing to a fixing element which is relatively flat and which essentially takes up little space, the said mechanism comprising an element provided with recesses, which is connected to the swivel fork and turnably connected with the fork, and can be locked in a given position by means of a control lever, characterized in that the locking mechanism is arranged in an essentially flat box-shaped supporting element, which also forms the fastening means of the castor to a trolley, said locking mechanism comprising a relatively large locking plate which can be moved laterally in relation to the turning axis of the fork when the control lever is displaced.

12 Claims, 2 Drawing Figures

LOCKING DEVICE FOR A CASTORWHEEL FORK

The invention relates to a locking device for a steerable castor, comprising a swivel fork connected by way of a roller bearing to a fixing element which is relatively flat and which essentially takes up little space. The mechanism comprises an element provided with recesses, and connected to the swivel fork. The element is turnably connected with the fork, and can be locked in a given position by means of a control lever.

A device of this type is described in the Dutch Patent Application No. 6701987. In this application the advantages of a locking device of flat construction are described, and the device additionally can easily be operated at a position remote from the load being transported.

The present invention provides a device of the indicated type, which in addition to having the advantages of the conventional device, displays at least two additional structurally favourable features.

Firstly, according to the invention, the device is designed so as to receive and absorb forces and bending moments transmitted from the steerable castor to the device, whereas, in the conventional device only a part of the fixing mechanism, e.g. the control lever, is designed to absorb these loads. Also, since the forces and moments are received and absorbed uniformly by the entire mechanism, a more stable device is obtained.

In addition the mechanism of the device of the invention is entirely enclosed in a compact, water-tight casing so that corrosion of the internal mechanism, by water or steam, can be substantially prevented. The above-mentioned advantages are obtained according to the invention, by arranging the locking mechanism in a relatively flat, box-shaped supporting element which also contains the mechanism for the steerable castor of a trolley. The mechanism comprises a relatively large locking plate, which can be moved laterally, relative to the axis of the swivel fork, by displacing the control lever.

In a preferred embodiment of the invention, one side of the box-shaped supporting element, can be attached with its cover to the trolley. The box of the element is provided with an aperture, through which the swivel fork extends. The aperture has a rim in which the roller bearing is mounted. The inner ring of the bearing is connected to the upper side of the swivel fork to which a bush or a ring is fitted at the other side of the supporting element. In this way a sufficiently rigid structure is obtained, since the device presents a large supporting surface. In a preferred version, the bush or ring has an edge which extends into the relatively large locking plate, and which can, if required, be rigidly locked to the plate.

As a result of such an arrangement secure locking or fixing of the swivel fork can be ensured, by relatively simple means.

The invention will now be explained in detail with reference to an embodiment thereof, whereby the advantages and other features of the invention will become evident.

Figure 1:
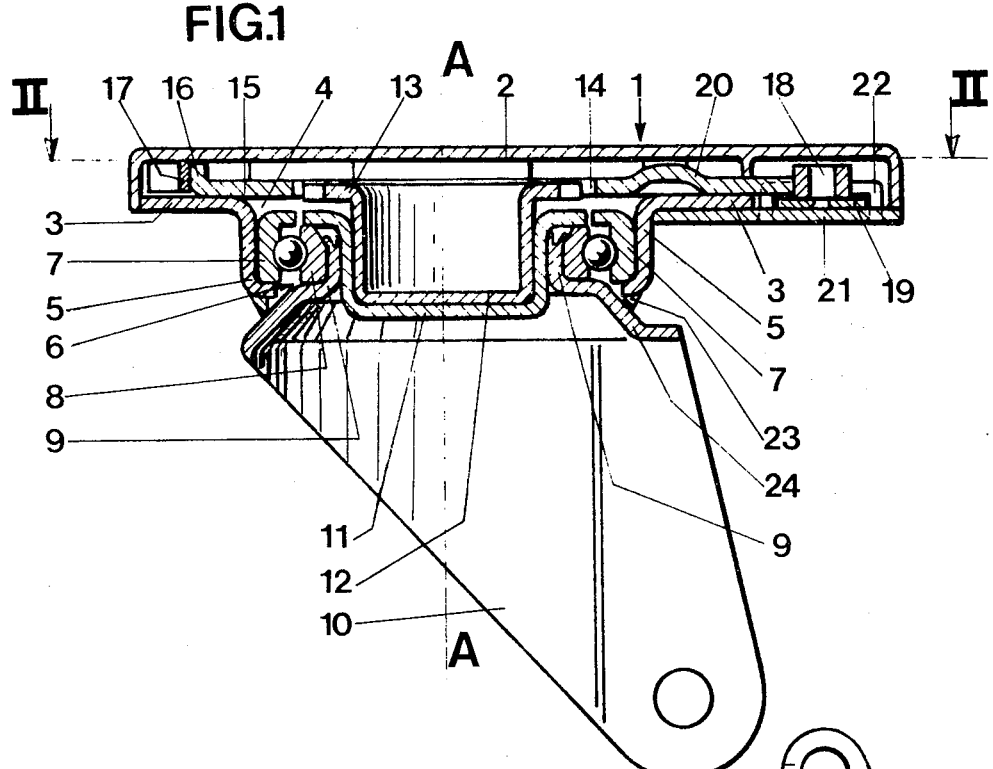
FIG. 1 is a cross-section of the device according to the invention.

As shown in FIG. 1, the device 1 comprises a housing 2, which can be attached by bolts (not shown) extending through holes 25, 26; (see FIG. 2) - to a trolley (not shown). The housing comprises a box-shaped member 3, provided with a recess 4, the rim 5, of which is adapted to receive a roller bearing 6. The outer ring 7 of the bearing 6 is fitted into the rim 5, while the inner ring 8 of the bearing is fitted over the upper rim 9 surrounding a recess in the upper surface of the swivel fork 10. On the inside of the upper rim 9 a bush or ring 11 is fitted. A second bush or ring 12 is fixed in the ring 11. The ring 12 has an edge 13 which extends into the aperture 14 of a locking plate 15. On one side of the plate 15 a bent up lip 16 is provided, against which a spring 17 presses. The other side of plate 15 engages a pin 18 of a control lever 19. Also on this side of plate 15 a projection 20 is arranged, formed in the plate itself. Due to the projection 20 and the bent-up lip 16 of plate 15, a constant distance is maintained between the plate 15 and the housing 2. A cover plate 21 is mounted against the box 3 and is held in place by the attaching bolts, through holes 25,26,(FIG. 2).

The cover plate 21 is provided with clips 22, for guiding the control lever 19. The plate 21 completely encloses lever 19 inside the box 3. An effective seal for the device 1 is provided by arranging a seal of synthetic material 23 at the rim 5 of the box-shaped member 3. This seal presses against the chamfered edge 24 of the swivel fork 10.

Figure 2:
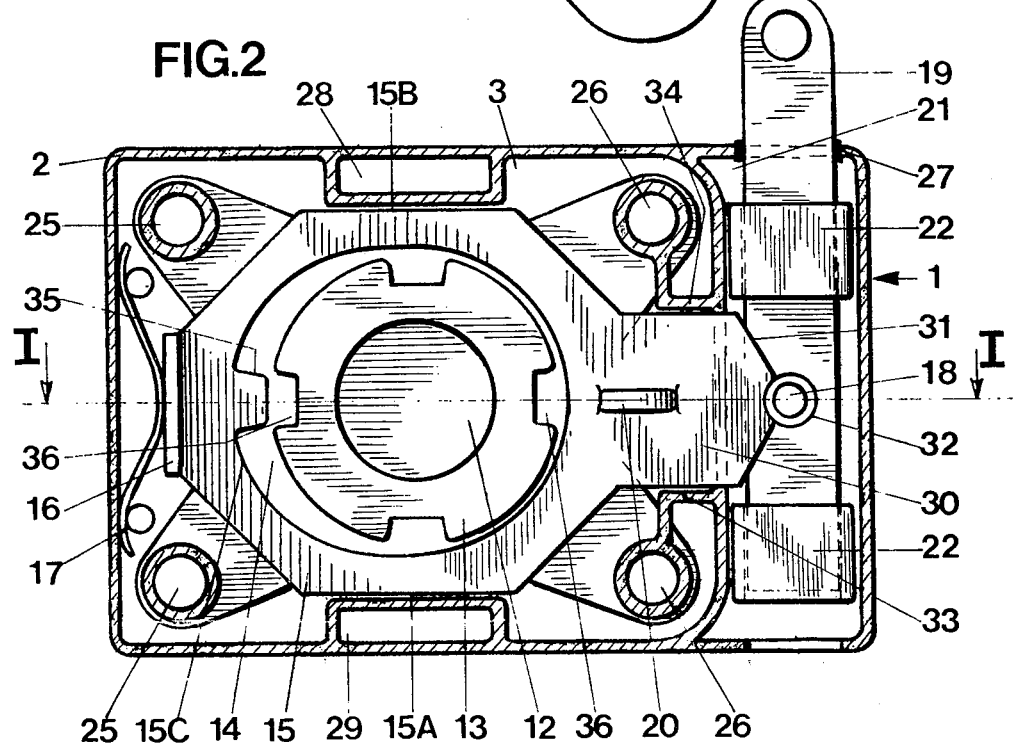
FIG. 2 is a plan-view of the device according to FIG. 1 showing a section of the housing through the line II — II of FIG. 1.

FIG. 2 is a plan-view of the device according to the invention, in which the housing 2 is partly omitted. The device can be attached to a trolley (not shown) by means of bolts (not shown). The bolts also serve for attaching the cover plate 21 to the device 1. In order to completely prevent the entry of dust and moisture to the internal mechanism, a seal 27 is provided between the control lever 19, cover plate 21 and housing 2. The plan-view of this embodiment shows particularly the shape of the locking plate 15 which occupies a main part of the device—s innerspace. The length and width of the locking plate 15 are nearly the same as the overall length and width of the device 1. The locking plate 15 preferably has an angular shape, which provides adequate lateral supporting sides or edges. The guide edges 15A and 15B of locking plate 15 are supported by guide members 28 and 29 respectively, the guide members forming an integral part of box-shaped member 3, or housing 2 of the device 1. The plate 15 has, in addition, a projecting part 30 which terminates, with a sloping portion 31, in a recess or groove 32, in which the pin 18 of control lever 19 is positioned, in the position as shown. The projection 30 is laterally supported, over a relatively long distance, by ribs 33 and 34 formed as an integral part of box 3 or housing 2.

Due to this arrangement and the fact that the locking plate 15 comprises the guiding elements 16 and 20, the locking plate 15 is adequately supported, and can move in a straight line. In locking plate 15 an essentially oval aperture 14 is formed, into which the edge 13 of the bush or ring 12 connected to the fork 10 extends. Between the edge 13 and the edge 15C of plate 15 a relatively large gap is provided, so that edge 13 can rotate freely in the aperture 14. A lug 35 on plate 15 also projects into the aperture 14; The plate can be moved so that the lug 35 extends into a recess 36 of edge 13, thereby locking the steerable castor in a fixed position. (The locked position is not shown in FIG. 2). The edge 13 is provided with a plurality of recesses 36, so that the locking element 12 can be fixed in several positions.

The device 1 shown in FIGS. 1 and 2 operates as follows.

FIG. 2 shows the position during which the swivel fork 10 with the castor (not shown) can rotate freely, i.e. the edge 13 of the bush 12, connected to the fork 10, being in the aperture 14 of the locking plate 15 is thus free to turn. The plate 15 is biased by the leaf spring 17, with the result that groove 32 of the locking plate 15 is pressed into contact with pin 18 of the lever 19. However, as soon as lever 19 is displaced pin 18 is disengaged from the groove 32 and plate 15 is moved due to the spring force of spring 17, this movement being in a straight line as determined by the guide members 28,29; 33,34. As a result of this movement the lug 35 enters one of the recesses 36 of the bush 12, which is connected to the fork 10, and locks it against further rotation. A swivel wheel (not shown) fitted in the fork 10 is thus locked in a fixed position, for movement in straight line.

In order to release the swivel fork 10, the control lever 19 has to be displaced so that pin 18 engages in the groove 32, by movement along the sloping portion of the plate edge 31, against the spring force. The original positions, as shown in FIG. 2 then is re-established.

In order to facilitate the operating of the control lever 19, it can form a part of a lever system of any suitable design, e.g. such that the operation of the lever 19 can for example be effected from the top of the trolley, instead of from underneath.

We claim:

1. In a steerable castor, having a mounting element, a swivel fork, a roller bearing pivotally mounting said swivel fork to said mounting element, and locking means including a control lever for inhibiting relative rotation of said swivel fork with respect to said mounting element; the improvement wherein said mounting element comprises a substantially flat box-shaped housing, said locking means comprising a substantially flat locking plate slidably mounted in said housing for movement in a plane perpendicular to the pivotal axis of said swivel fork, and means in the plane of said locking plate fixedly mounted with respect to said swivel fork and positioned to lockingly engage said locking plate at a first position of said plate in said plane, said control lever being mounted for movement in the plane of said plate to displace said plate between said first position and a second position at which said fork is free to rotate.

2. The steerable castor of claim 1 wherein said housing has a flat mounting surface for engaging a surface on which said castor is to be mounted.

3. The steerable castor of claim 1 wherein said housing has a recess with a rim, said roller bearing being housed in said rim.

4. The steerable castor of claim 3 wherein said bearing has an outer race mounted in said rim and an inner race connected to said swivel fork, and further comprising a ring affixed to said swivel fork, said plate having an aperture, said ring having an edge extending into said aperture and in the plane of said plate, one of said plate and said ring having a projection and the other of said plate and said ring having a recess in said aperture and positioned to engage said projection in said first position of said plate.

5. The steerable castor of claim 4 wherein said aperture in said locking plate is substantially oval, said projection comprising a projecting lug in said locking plate extending into said aperture, whereby said lug engages the recess in the edge of said ring in said first position of said plate to inhibit rotation of said swivel fork.

6. The steerable castor of claim 1 further comprising spring means in said housing positioned to bias said locking plate to said first position.

7. The steerable castor of claim 1 wherein said plate has a pair of side edges extending parallel to the direction of slidable movement thereof, said housing comprising guiding surfaces slidably engaging said edges of said locking plate.

8. The steerable castor of claim 1 wherein said control lever is mounted in said housing, said locking plate having an angular shape and having a projection extending toward said control lever, said control lever having a pin positioned to engage said projection of said locking plate.

9. The steerable castor of claim 1 wherein said housing comprises guide means positioned to guide said locking plate for movement solely between said first and second positions.

10. The steerable castor of claim 1 wherein the length and width of said locking plate are only slightly smaller than the length and width of said housing.

11. A swivel castor comprising a housing having first and second opposed walls and edges extending between said walls, said first wall defining an external mounting surface, an aperture in said second wall, a roller bearing having outer and inner races, means holding said outer race in said aperture whereby the rotational axis of said bearing is perpendicular to said mounting surface, a swivel fork for holding a castor wheel, said fork being fixedly held in said inner race and extending from said second wall of said housing, a locking plate in said housing, means retaining said locking plate for linear sliding movement in a plane parallel to said axis, said locking plate having an aperture, a collar means fixed to said swivel fork and extending in said aperture in the plane of said locking plate, one of said locking plate and collar means having a recess and the other of said locking plate and collar means having a projection in said aperture, control lever means slidably mounted in said housing and having one end extending through an edge of said housing, means resiliently biasing said locking plate to urge one side of said aperture towards said collar means whereby at a given angular displacement of said swivel fork said last mentioned recess and projection engage to inhibit rotation of said swivel fork, said control lever comprising means engaging said locking lever for displacing said locking lever out of engagement with said collar means to permit rotation of said swivel fork.

12. The swivel castor of claim 1 wherein said control lever has a pin extending therefrom in said housing, said locking plate having an outer edge with a groove and an adjacent control edge on one end thereof, said control lever being slidable to position said pin selectively into engagement with said groove and said control edge, and said biasing means biasing said end of said locking plate toward said pin, whereby when said pin engages said groove, said last mentioned recess and projection are held apart and movement of said control lever when said pin engages said control edge effects displacement of said locking plate.

* * * * *

UNITED STATES PATENT AND TRADEMARK OFFICE
CERTIFICATE OF CORRECTION

PATENT NO. : 3,974,542
DATED : August 17, 1976
INVENTOR(S) : Hendrikus J.M.Timmer It is certified that error appears in the above–identified patent and that said Letters Patent are hereby corrected as shown below:

Column 2, line 40 change "device_s" to --device's--.

Column 4, line 56 change "claim 1" to --claim 11--.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks